July 4, 1961     H. L. BAUMBACH ET AL     2,990,762
AUTOMATIC CONTROL DEVICE Filed March 4, 1957                          4 Sheets-Sheet 1

INVENTORS
HARLAN L. BAUMBACH
HOWARD M. LITTLE
LORAND WARGO
By *[signature]*
ATTORNEY July 4, 1961

H. L. BAUMBACH ET AL 2,990,762

AUTOMATIC CONTROL DEVICE

Filed March 4, 1957

INVENTORS
HARLAN L. BAUMBACH
HOWARD M. LITTLE
LORAND WARGO

By *Ernest T. Hiley*

ATTORNEY

July 4, 1961　　H. L. BAUMBACH ET AL　　2,990,762
AUTOMATIC CONTROL DEVICE

Filed March 4, 1957　　4 Sheets-Sheet 4

Fig. 7B

INVENTORS
HARLAN L. BAUMBACH
HOWARD M. LITTLE
LORAND WARGO
By Ernest J. Lilly
ATTORNEY

United States Patent Office 2,990,762
Patented July 4, 1961

2,990,762
AUTOMATIC CONTROL DEVICE
Harlan L. Baumbach, Howard M. Little, and Lorand Wargo, Los Angeles, Calif., assignors, by mesne assignments, to Bell & Howell Company, a corporation of Illinois
Filed Mar. 4, 1957, Ser. No. 643,558
15 Claims. (Cl. 95—75)

This invention relates to photographic film printing machines, and more particularly to a new and improved automatic light change mechanism for film printers.

During the printing of developed motion picture film on raw film stock, the intensity of the printing light beam impinging on the film is generally corrected from scene to scene for reasons well understood in the art.

One type of light modulating means for this purpose embodies an adjustable shutter or the like, which is movable into and out of the printing beam by movement of a member, coupled to the shutter. The shutter is movable to different preestablished positions, to establish different printing light conditions in the printer, by movement of the member to different preset positions.

Movement of the shutter into the beam, for example, eclipses the latter so as to decrease the intensity of the beam at the developed film strip being printed. This invention is concerned with film printers employing light modulating means of this general character.

In the more costly present-day film printing machines, modulation of the printing beam is accomplished automatically by operation of control mechanism incorporated directly in the machines. The advantages of automatic control of printing light intensity will be obvious. The primary advantages are, of course, that the element of human error is substantially eliminated so that correct printing light changes are assured, and film may be printed at appreciably higher speeds.

The printers of the type referred to, which are used by many film laboratories, however, are of less costly or early design and require manual operation of the light change mechanism to accomplish the several changes in printing light intensity necessary during the printing of a given developed film.

By way of example, in one of the more widely used manually controlled printers of this type, the light control mechanism consists of a cylindric shutter which is adjustable, by manual operation of a crank externally of the machine. The crank is manually adjustable to align a pointer thereon with a selected one of thirty divisions on a light change scale located behind the pointer. This scale is so calibrated as to yield 30 different printing light intensities.

Mounted on the printer directly above the scale is a holder for a light change card bearing a list of the successive crank positions necessary to achieve the proper printing light corrections during the printing of a given film. A pointer on the machine is moved along this list, from one light change to the next, in response to each actuation of pointer operating mechanism by cuing notches cut in the developed film, to indicate the next following crank position.

In manual operation of the printer, the operator repositions the crank to align its pointer with the next scale setting indicated on the card, each time an audible warning buzzer is sounded in response to a cuing notch in the film.

The illustrative embodiment of this invention comprises an automatic control attachment adapted to be mounted on a manual film printer of the above type, for converting the latter to automatic preset operation. The attachment is so designed as to require substantially no modification of the existing printer. It will become clear as the description proceeds, however, that the invention may assume the form of an integral part of the printer which is initially designed for automatic operation.

Briefly stated, the present invention provides an automatic light change mechanism for preselectively positioning the light modulating means of film printers of the type under discussion. The light change mechanism of the invention embodies two main components, namely, an information storage system which may be preset in accordance with the desired printing light corrections and an electromechanical control system for periodically positioning the printer light modulating means in accordance with the light change information contained in the storage system.

One of the most efficient and compact information storage means for use in automatic control devices of this character, and that employed in the illustrative control attachment, is the well known control tape which is preformed with a series of coded control sets or groups and tape reader for sensing the control sets or groups. To the end of simplicity and compactness of the equipment, the coding employed in the control groups is generally based on the binary system. The light modulating means of the printer, on the other hand, must be positioned according to a decimal system. That is, for example, the aforementioned printer crank has, as mentioned, thirty positions whereas a binary coding system based on only five digits is employed in the information storage system.

It will be apparent, therefore, that first the control mechanism of the invention must be capable of converting the coded binary information supplied by the information storage system to the decimal information necessary to positioning of the printer light modulating means.

When a light correction is effected, the direction in which the modulating means must be moved is dependent on the light correction required. That is, the modulating means will be moved in one direction or the other from its instant position, depending on whether the printing light intensity is to be increased or decreased. A second requisite of the present control mechanism is, therefore, that its control system be capable of sensing the converted light change information to effect the proper direction of movement of the modulating means for accomplishing a given light correction.

Thirdly, of course, the control mechanism must be operative to terminate movement of the modulating means at the preselected light change position indicated by the converted light change information.

Finally, especially in the case of an attachment, the control mechanism should be adjustable to accommodate its use on a particular printer or on different printers. That is, the shutters of film printers, for example, are individually calibrated. The positions of the light modulating means for the different light intensities, therefore, generally vary slightly from one printer to another. The present central mechanism, accordingly, should be adjustable to compensate for these variances.

The present invention possesses the above and other features so as to be fully capable of performing its intended function.

In the light of the foregoing discussion, a broad object of the invention may be stated as being the provision of a new and improved automatic light change mechanism for film printers of the character described.

A more specific object of the invention is the provision of an automatic light change mechanism which may assume the form of an attachment to be mounted on a normally manually controlled printer for converting the same to automatic operation or an integral part of an automatic printer.

Another object of the invention is the provision of an automatic light change mechanism of the character described embodying a simplified computer for converting coded binary information contained on a control tape to decimal information for automatic preselected positioning of the light modulating means of a printer of the character described.

Yet another object of the invention is the provision of an automatic light change attachment for film printers which may be assembled on the latter with a minimum of alteration of the printer.

A further object of the invention is the provision of an automatic light change mechanism for film printers which is adjustable to correspond to the calibration of a particular film printer.

Still a further object of the invention is the provision of an automatic light change mechanism of the character described embodying interlock features which prevent operation of the mechanism and printer controlled thereby until certain requirements, assuring proper operation of the mechanism and printer have been fulfilled.

Yet a further object of the invention is the provision of an automatic light change mechanism of the character described wherein the light control shutter is intermittently positioned in accordance with coded sets of control information and wherein the control system of the mechanism incorporates novel direction sensing means for conditioning the mechanism for movement of the printer light modulating means in the proper direction from the position established by one control set to the position established by the next following control set.

A still further object of the invention is the provision of a tape controlled, automatic light change mechanism of the character described which is operative to cause automatic shut down of the printer and feeding of the control tape out of the tape reader at the end of a printing operation.

Briefly, the foregoing and other objects and advantages are achieved in the illustrative automatic control attachment for motion picture film printers of the type preliminarily described, by the provision of a housing adapted for mounting on the light change plate of the printer. Journalled in and located externally of the housing is a crank arm having means for coupling to the light change crank of the printer.

The crank arm of the attachment is driven in opposite directions by a reversible drive mechanism within the housing. Operation of this drive mechanism is controlled by automatic control mechanism including a control tape which is preformed with a series of coded control sets or groups. These control groups are sensed by a tape reader through which the control tape is intermittently advanced, to successively align the control groups with the reader. Intermittent advancing of the tape occurs in response to cuing notches in the film being printed.

The control mechanism is operative in response to the sensing of each control group to cause driving of the attachment crank arm, and, therefore, the light change crank of the printer, to one of thirty different positions determined by the coding of the respective control groups. Means are provided for adjusting the positions of the attachment crank arm to correspond with the light change positions of a particular printer crank.

The control mechanism comprises a unique and simple computer mechanism for converting the information stored on the control tape, which is in binary form, to decimal information necessary for positioning of the attachment and printer cranks. Also included in the control mechanism are control means for sensing this converted light change information to establish the proper direction of crank movement to achieve a given printing light correction and for terminating crank movement at the proper setting.

Certain interlock features are embodied in the attachment which preclude its operation and that of the printer until certain requirements, assuring proper operation of the equipment, have been met. The control system of the attachment is operative to cause initial automatic advancing of the control tape to align the first control group thereon with the tape reader and automatic termination of printer operation in response to predetermined coding of a control group.

In operation, the light change crank of the printer is sequentially positioned, by the attachment, in preselected ones of its thirty positions to accomplish the several desired light corrections during the printing of a given film. The last control group of the control tape is coded to cause shut-down of the equipment at the end of the printing operation.

A better understanding of the invention may be had by reference to the following detailed description taken in connection with the annexed drawings, wherein.

Referring first to FIGURES 1–5 of these drawings, the numeral 20 denotes a standard film printing machine of the type preliminarily mentioned. Printer 20 comprises a housing 22 which encloses a lamp, not shown, from which a printing light beam is directed through a shutter mechanism 24 onto the developed film strip 26 being printed. Raw film strip 28 has thereby formed thereon latent images of the several frames of the developed film strip.

Shutter mechanism 24 is of conventional design and, therefore, has not been illustrated, nor will it be described in detail. Suffice it to say here that the shutter mechanism embodies shutter plates which are movable toward or away from one another by swinging of a light change crank 30 (FIGURES 4 and 5) in one direction or the other.

Swinging of crank 30 is one direction moves the shutter plates together, thereby gradually eclipsing the printing beam and diminishing the intensity of the beam at the film. Similarly, movement of the crank in the other direction results in a gradual increase in the intensity of the printing beam at the film.

Crank 30 carries a pointer 32 which moves over a scale 34 inscribed on a circular plate 36. Plate 36 is rigidly attached to the housing 22 of the printer. Scale 34 has thirty-one divisions, numbered from zero to thirty, with which pointer 32 is adapted to be selectively aligned by swinging of the crank. The crank is adapted to be releasably locked in each of these positions by engagement of a pin 37, on the crank handle 38, in a series of holes 40 in the plate 36. A spring 42 normally retains the pin 37 in a hole 40, the pin being retractable to permit swinging of the crank.

The existing printer mounts a holder 44 (FIGURE 1) for a light change card 46. Card 46 bears a list of the successive crank positions necessary to achieve the proper light corrections for a particular film. A pointer 48 is moved along this list, from one change to the next to indicate each succeeding change, in response to actuation of a film switch by cuing notches in the developed film strip 26.

In manual operation of the printer, the operator repositioned the crank 30 in accordance with the next change indicated on card 46 each time a signal was energized to indicate a light correction. The laboriousness and strain of performing a series of such manual light corrections, especially in rapid succession, will be apparent.

These and the other earlier noted disadvantages of such manual control are overcome by use of the present automatic control attachment 60. As will be clear as the description proceeds, the light change crank 30 is automatically moved to predetermined positions in preselected sequence and in synchronism with film movement, by the attachment, to accomplish automatically the several printing light corrections desired for a particular film.

Attachment 60 illustratively comprises a housing 62 having a removable cover to permit access to the housing interior. Fixed to the housing 62 is a mounting bracket 64 formed with a curved flange 66. Flange 66 has a cylindric groove 68.

Journalled in and extending exteriorly of the attachment housing 62 is a final driven shaft 70 of the attachment. Shaft 70 rigidly mounts a radial crank arm 72 having a conical bearing 74 extending coaxially from its inner end. The free end of the crank arm 72 has a longitudinal slot 76.

In assembly of the attachment on the printer, the former is merely hung on the scale plate 36 with the upper periphery of the later engaging in the cylindric groove 68 of bracket flange 66. The pin 37 of the printer crank 30 is retracted and engaged in the arm slot 76. The pin is thereby retained in retracted position.

The only modification of the existing printer which is necessary is the replacement of a crank attaching bolt, not shown, by a bolt 78 having a conical recess 80 for journalling the conical bearing 74 on the attachment. This locates the attachment shaft 70 concentric with the axis of the printer crank 30. Clamp screws 82 are provided for clamping the attachment firmly to the scale plate 36.

From the description thus far, it will be seen that when the attachment is assembled on the printer, shaft 70 of the attachment is coupled to the printer crank so as to be capable of driving the latter in opposite directions. During operation of the attachment, shaft 70, and, therefore, printer crank 30, are intermittently driven to a series of preselected sequential positions, to accomplish a series of preselected light corrections, by an automatic control mechanism 100, FIGURES 1 and 7, embodied in the attachment.

Control mechanism 100 comprises three main components, namely, a reversible drive system 102 for the shaft 70, an information storage system 104 which is preset in accordance with the desired light corrections, and an electrical control system 106 responsive to the information storage system 104 for controlling the drive system 102 to effect sequential positioning of shaft 70 in accordance with the presetting of the storage system.

Figure 1:
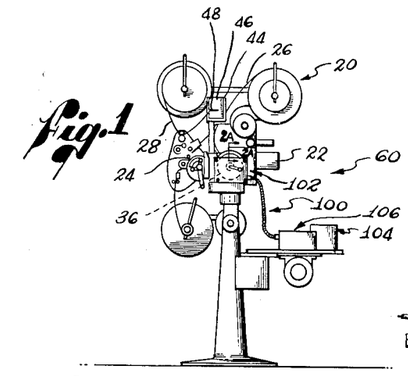
FIGURE 1 is a view of a film printer embodying the present attachment.
Figure 2:
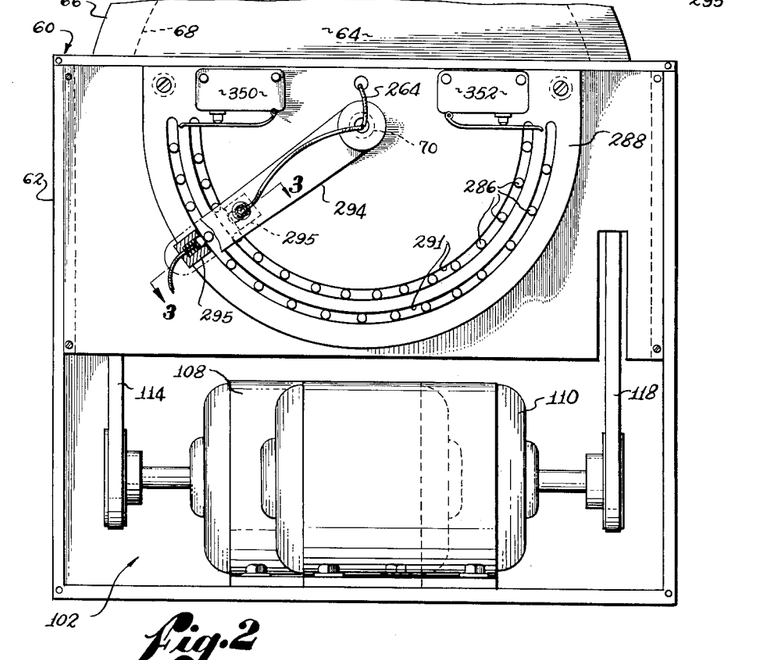
FIGURE 2 is an enlarged front elevation of the housing of the present attachments, parts of the housing being omitted to expose the interior thereof.
Figure 2A:
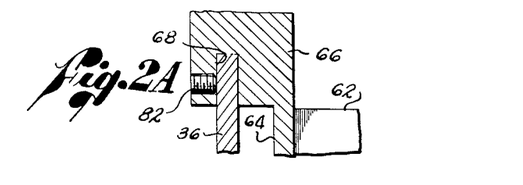
FIGURE 2A is an enlarged section taken along line 2A—2A of FIGURE 2.
Figure 3:
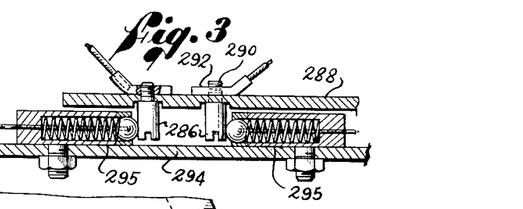
FIGURE 3 is an enlarged section taken along line 3—3 of FIGURE 2.
Figure 4:
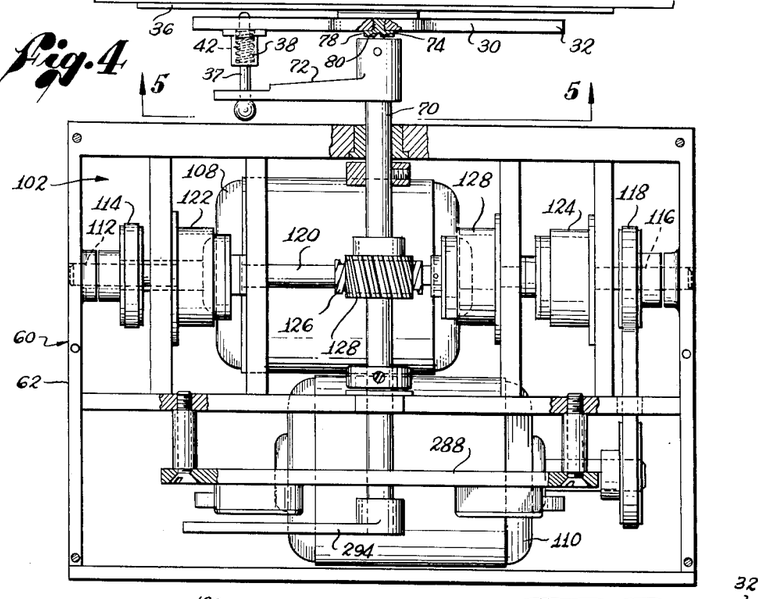
FIGURE 4 is a top plan view of the housing of FIGURE 2, parts of the same being omitted for clarity and to expose the drive mechanism contained therein.

In FIGURES 2 and 4, reversible drive system 102 will be seen to be mounted in housing 62 of the attachment. As shown, the drive comprises a pair of motors 108 and 110 which, during operation of the attachment, are continuously energized. Motor 108 is coupled to a shaft 112 through a belt drive 114 and motor 110 is coupled to a shaft 116 through a belt drive 118.

Shafts 112 and 116 are concentric and spaced, as shown. Extending between and coaxial with the shafts 112 and 116 is a shaft 120. Indicated at 122 and 124 are a pair of electromagnetic clutches which are selectively energized during operation of the attachment to couple the shaft 120 to one or the other of the driving shafts 112 or 116.

The directions of rotation of the motors 108 and 110 are such that shaft 120 will be driven in one direction when clutch 122 is energized and in the opposite direction when clutch 124 is energized. Shaft 120 carries a worm gear 126 which meshes with a worm wheel 128 fixed on the attachment shaft 70 so that the latter shaft is driven in one direction or the other from the shaft 120, depending on which of the clutches 122 and 124 is energized.

Associated with shaft 120 is an electromagnetic brake 128. Brake 128, when deenergized, releases the shaft 120 for rotation by one or the other of the motors 108 and 110. When the brake is energized, shaft 120 is restrained against rotation.

Briefly, then, shaft 70, and, therefore, the printer crank 30 may be selectively driven in one direction or the other by simultaneously energizing one of the magnetic clutches 122 or 124 and deenergizing the brake 128. Similarly, shaft 70 and printer crank 30 may be stopped in a given angular position by simultaneously deenergizing the energized clutch and reenergizing the brake. During a printing operation, the brake and clutches are thus operated in an intermittent, pre-established manner to cause driving of the printer crank to a series of preselected, sequential light change positions in accordance with the desired printing light corrections for the film being printed.

The information storage system 104 (FIGURE 7A) is provided to enable "presetting" of the desired printing light corrections into the control attachment. Various types of information storage means may be employed. The storage system illustrated utilizes a control tape 132 containing a series of coded, perforated control groups 134 wherein the coding is based on the number and arrangement of the perforations 136 in the control groups, as will be hereinafter explained. In the illustrated control tape, each control group defines five control positions, designated as 142a–142e, in which a perforation may be preformed.

Tape readers for use with such perforated control tapes are well known in the art. For simplicity of illustration, the reader 138 has been shown as comprising a series of contact brushes 144a–144e, each associated with one of the control group positions 142a–144a, and a platen 146 which is contacted by the brushes when a perforation exists in their respective positions of the control group aligned with reader. If one or more perforations are absent from a control group, the respective brushes will be insulated from the platen by the material of the tape.

Intermittent advancing of the control tape in synchronism with film movement to align the successive control groups 134 with the reader is effected by an interrupter switch 148 engageable in a series of cuing notches 150 cut in the negative film 26 at positions along the latter where a light correction is required. As will be presently more fully explained, closure of the interrupter switch 148, in response to movement of a cuing notch 150 therepast, acts to pulse a tape advance unit 152 embodied in the reader and cause advancing of the control tape from one control group to the next.

During operation of the attachment, the light change information contained on the control tape is supplied to the electrical control system 106, the latter being operable in response to this light change information to control the drive system 102 in such manner that the printing light intensity is varied in accordance with the preset tape information. This control system will now be described.

Electrical power for operating the attachment is received from an A.C. supply through a pair of input terminals 154, 156. Connected to these input terminals are a pair of main A.C. supply leads 158 and 160, the former including a set of series connected main switch contacts 162A.

Indicated at 164 is a power transformer, the primary of which is connected across the main power leads 158 and 160 so as to be energized by closing of the main switch contacts 162A. The secondary of transformer 164 is connected in a rectifier network 166 comprising, in effect, a pair of half wave rectifiers having a common center lead. The three output terminals of this network have been designated as 166A, 166B and 166C. Extending from these output terminals are three main D.C. supply leads 168, 170 and 172.

Electrical power is fed to the motors 108 and 110 of the reversible drive system 102 through a pair of common leads 174 and 176. Motor lead 174 connects directly to the A.C. supply lead 160, while motor lead 176 connects to the other A.C. supply lead 158 through a set of normally open, series connected, relay contacts 178A.

Motors 108 and 110 are, therefore, energized by closing of the main switch contacts 162A and the relay contacts 178A. The coil 178 for the relay contacts 178A has one end connected to one of the plates in a twin triode 180, the corresponding cathode of which is connected to the D.C. power lead 170 through a lead 182. The grid in this half of the tube is placed at plate potential by the grid-plate connection shown.

The other end of the relay coil 178 is connected to the D.C. supply lead 172. It will be seen, therefore, that closing of the main switch contacts 162A energizes the left half of the tube 180. The resulting current flow through the relay coil 178 causes closing of the relay contacts 178A and energizing of the drive system motors 108 and 110. Heating of tube 180 to operating temperature is delayed, as will presently be described.

The remainder of the control mechanism is conditioned for operation as follows. Indicated at 184 is the coil of a main control relay including normally open contacts 184A and 184B. As will presently be seen, this main relay controls the energizing of the remainder of the control mechanism, the latter remaining deenergized until the relay contacts 184A and 184B are closed by completion of an energizing circuit through the relay coil 184.

One leg of this latter circuit may be traced from the input terminal 154, through lead 158, main switch contacts 162A, lead 176, contacts 178A of the tube relay 178, and then through leads 186, 188 and 190 to one end of the main control relay coil 184. The other end of the latter coil is connected to the other input terminal 156 via leads 192, 194, a group of normally open, series connected microswitches, collectively designated 196, in the reader 138, and then through lead 198 to the main A.C. power lead 160 from the input terminal 156.

The main relay 184, therefore, is energized and its contacts 184A and 184B are closed by closing of the tube relay contacts 178A and the group of reader switches 196. As just described, tube relay contacts 178A are closed in response to closing of the main switch contacts 162A. The group of switches 196 comprise conventional safety switches incorporated in the standard type reader described previously and have, therefore, been only schematically illustrated and will not be described in detail.

Suffice it to say here that at least some of the switches 196 will be open in the absence of a control tape in the reader 138, or if a tape is improperly threaded in the reader. One of the safety switches 196a, for example, is opened in response to excessive tension in the control tape. If, however, a control tape is properly inserted in the reader, the safety switches 196 will all be closed. The energizing circuit through the main control relay 184 is thereby completed and its contacts 184A and 184B are closed.

Several actions occur in the control mechanism in response to this closure of the main relay contacts. One of these actions is that of effecting automatic threading or advancing of the control tape 132 through the reader 138 to align the first control group 134 on the tape with the reader brushes 144. This automatic threading operation is accomplished as follows.

Closure of the main relay contacts 184A completes a circuit from the positive D.C. supply lead 170, through a lead 200, having the now closed contacts 184A series connected therein, and a lead 202 to one end of a relay coil 204. This relay comprises three sets of normally open contacts 204A, 204C and 204D and one set of normally closed contacts 204B.

The energizing circuit for the relay coil 204 is completed through a lead 206, connected to the other, or upper end of the coil 204, its normally closed contacts 204B, a lead 208, through a now established current path, designated at 210, in a computer device 212 to be presently discussed, and thence to negative D.C. supply lead 168. Assuming for the moment that current path 210 exists, therefore, it will be seen that relay 204 is energized by closing of the main relay contacts 184A.

As was preliminarily mentioned and as will be hereinafter more fully described, the computer device 212 is operative to convert the coded binary information contained on the tape 132 to the decimal information necessary for positioning of the attachment shaft 70. Briefly, the computer 212 comprises a series of relays 214, 216, 218, 220 and 222 which are selectively energized, as will be described, by contact of their respective reader brushes 144 with the reader platen 146.

During the abovementioned automatic tape threading operation, it will be clear that since the first control group is not yet aligned with the reader brushes, all of the latter are insulated from the platen 146 by the control tape 132 and all of the relays 214–222 are, therefore, deenergized. As will be more fully discussed, certain of the contacts of the latter relays are closed and connected in series in the deenergized condition of those relays to establish the abovementioned current path 210.

It will also become clear from the later description of the computer 212 that energizing of any one or more of the computer relays 214–222 by contact of their respective reader brushes with the reader platen upon aligning of the first control group 134 with the reader brushes breaks the current path 210 through the computer.

Returning now to the automatic tape threading operation, closure of the main relay contacts 184A, as just mentioned, energizes the relay 204. Indicated at 224 is a condenser having one terminal connected to lead 202 and the other terminal connected to lead 206 through a set of normally closed contacts 226A of a relay 226. As will presently be seen, the latter relay is deenergized at this time so that its contacts 226A are closed, as shown. It will be observed, therefore, that condenser 224 is connected in shunt with the relay 204 and has a D.C. potential impressed across it by closure of the main relay contacts 184A.

Immediately upon energizing of the relay 204, its normally closed contacts 204B open, thereby breaking the energizing circuits of both the relay 204 and the condenser 224. The condenser 224 now discharges through the relay coil 204 to maintain the latter energized for a brief instant of time.

After the discharge of the condenser 224, the relay 204 deenergizes and its contacts 204B reclose to reestablish the energizing circuits of the relay and condenser. This, of course, results in recharging of the condenser, reenergizing of the relay 204, and reopening of its contacts 204B to repeat the cycle. It is clear, therefore, that so long as the current path 210 exists through the computer, relay 204 is alternately energized and deenergized. The normally open contacts 204A of the relay are thus alternately closed and reopened.

One terminal of the relay contacts 204A is connected, via lead 228, to lead 190. The other terminal of the contacts 204A are connected, via a lead 230, to one terminal of the tape advance unit 152, the other terminal of the latter connecting via lead 232 to lead 192. Contacts 204A and the tape advance unit, therefore, are, in effect, connected in parallel with the main relay coil 184 which is presently energized. Accordingly, alternate closing and opening of the contacts 204A of relay 204, as described above, results in the delivery of a series of pulses to the tape advance unit. The advance unit 152 is operative in response to this pulsing thereof to continuously, intermitently advance the control tape 132 through the reader 138. In some cases, the means for effecting this automatic initial threading of the tape through the reader may be embodied in directly the reader itself.

This continuous, intermittent advancing of the tape through the reader continues until the first control group 134 is aligned with the reader brushes 144, whereupon the current path 210 through the computer 212 is interrupted, as briefly discussed above and as will be presently more fully described. Opening of the current path 210, of course, breaks the energizing circuit of the relay 204 with resultant terminating of the automatic tape threading operation.

Generally indicated at 233 are control means which are rendered operative in response to the first and each succeeding control group on the control tape to initiate and terminate operation of and control the direction of driving of the drive system 102. This control means 233 comprises a pair of thyratron tubes 234 and 236, each having one of the drive system clutches 122 and 124 in their plate circuit, as shown. Briefly, during operation of the attachment, as will be hereinafter more fully described, one or the other of the tubes 234, 236 are caused to conduct, so as to energize and thereby engage its respective clutch, and the drive system brake is simultaneously deenergized and thereby released, to effect rotation of the attachment shaft 70 in one direction or the other. Upon rotation of the shaft 70 to a predetermined angular position, determined by the preset information supplied by the storage system 104, the thyratron circuit is opened to deenergize the engaged clutch, and the brake is simultaneously reenergized and thereby engaged to terminate driving of the shaft 70. A twin triode power tube 240 is employed as a cut-off device to accomplish this opening of the thyratron circuit, as will be hereinafter more fully discussed.

A second action resulting from energizing of the main control relay is that of delivering power to the control means 233 so as to condition the latter for operation while retaining the control means in an inactive state during the automatic threading of the tape, just described, so that undesirable vibratory movement in the drive system 102 is avoided.

This second action is accomplished through the following circuitry. The cathodes of the thyratrons 234 and 236 are connected to the D.C. supply lead 170 through leads 242 and 244, respectively. The plate of tube 234 is connected to one terminal of clutch 122 and a relay coil 246 which are arranged in parallel in the plate circuit of the tube 234, as shown. The plate of tube 236 is connected to one terminal of clutch 124 and a relay 248 which are arranged in parallel in the plate circuit of the tube 236.

The other terminals of the clutches 122, 124 and the relay coils 246, 248 are connected to a common lead 250 through the normally closed contacts 246A and 248A of the relays 246 and 248, respectively. As shown, contacts 246A and 248A are arranged in parallel. Lead 250 extends to the cathodes of the cut-off tube 240 through a second set of main switch contacts 162B which are closed simultaneously with closing of the earlier mentioned main switch contacts 162A.

The plates of the cut-off tube 240 are connected, via a lead 252, having the main relay contacts 184B series connected therein, to one terminal of a second set of normally open contacts 178B of the tube relay 178.

From the description thus far, it will be clear that if a control tape is properly threaded in the tape reader 138 and the main switch contacts 162A and 162B are closed, main relay contacts 184B and tube relay contacts 174B will be closed and the plates of the cut-off tube will be connected to the D.C. supply lead 172 through those contacts.

The plate in the right half of the tube 180 is connected to the D.C. supply lead 172 through a lead 254, main switch contacts 162B, cut-off tube 240, lead 252, main relay contacts 184B, and tube relay contacts 178B. The right hand cathode of the tube 180 connects to the D.C. supply lead 170 through a cathode follower resistor 256. As will be seen, the right half of tube 180, including the cathode follower resistor 256, are provided to initiate conduction of one of the thyratrons under certain conditions of mal-operation.

Brake 130 has one terminal connected to the D.C. supply lead 172 through a lead 258 having a condenser 260 and resistor 262 in parallel therein. The other terminal of the brake is connected to a lead 264 through a lead 266. The cathodes of the cut-off tube 240 are connected to the lead 266 through a lead 268, including a grid leak resistor 270.

One end of lead 264 connects to one terminal of a set of normally open contacts 272A in a relay 272. The other terminal of these latter contacts are connected to the negative D.C. supply lead 168 through a lead 273. The other end of lead 264 connects to the computer 212. The computer will shortly be described in greater detail. Suffice it to say for the present, that during the interim between closing of the main switch contacts 162A and 162B and alignment of the first control group 134 on the control tape 132 with the reader brushes 144 by the automatic threading operation previously discussed, the right hand end of lead 264, as viewed in FIGURE 7, will, in effect, be open.

Also, as will presently be seen, relay 272 is deenergized during this interim, and, in fact, remains deenergized until the last control group on the control tape is aligned with the reader brushes. Contacts 272A of the latter relay, therefore, may, for the present, be considered to be open.

The only electrical connection to lead 264 at this time is via a lead 276, to one terminal of the normally open contacts 204C of the relay 204, the other terminal of which contacts is connected to the negative D.C. supply lead 168 through a lead 278. The latter lead 278 also connects to one terminal of the normally open contacts 204D of the relay 204, the other terminal of which contacts is connected to the right hand grid of tube 180 through a lead 280.

It will be seen, therefore, that in the above-mentioned interim, during which automatic threading of the control tape occurs, in the manner previously described, both the grid of the cut-off tube 240 and the right hand grid of the tube 180 have intermittently impressed thereon a negative D.C. potential from the D.C. supply lead 168 by periodic closing and reopening of the contacts 204C and 204D in response to previously described intermittent energizing of the relay 204.

Connected between the right hand grid of tube 180 and the D.C. supply lead 170 are a resistor 282 and condenser 284 arranged in shunt fashion. During the closed periods of relay contacts 204D, wherein a negative potential is applied to right hand grid of tube 180, condenser 284 is charged. Subsequent discharging of this condenser through its parallel resistor 282, during the open periods of the relay contacts 204D maintains the negative potential on the latter grid, the circuit being so designed that this negative potential is sufficient to maintain the right hand side of tube 180 below cut-off during automatic threading of the tape. This prevents the thyratron, which is controlled, under certain conditions, by the right half of the tube 180, as briefly mentioned before, from being activated by the latter tube during automatic threading of the tape.

This negative potential retains tube 240 below cut-off so that the plate circuits of the thyratrons 234 and 236 are open. The latter are, therefore maintained in a highly negative state during automatic threading of the tape. Alternate charging of the condenser 260 and discharging thereof through its shunt resistor 262 during intermittent closure of the relay contacts 204C maintains a negative potential on the grids of the cut-off tube.

Tube 240 and the right hand side of tube 180 are thus retained in a condition of cut-off in order to assure retention of the thyratrons 234 and 236 in a non-conductive state and thereby maintain the clutches 122 and 124 in a disengaged condition.

The control mechanism is retained in this inactive condition during automatic threading of the tape in order to prevent undesirable oscillatory or vibratory movement in the mechanical drive system 102.

From the description thus far, it will be seen that completion of the energizing circuit through the automatic advance relay 204, as well as completion of the plate supply circuits of the thyratrons 234, 236 and the cut-off tube 240 is dependent on energizing of the main control relay 184, which, in turn, can occur only after a control tape has been properly threaded in the tape reader. Completion of the plate circuits of the thyratrons 234 and 236 and the cut-off tube 240 is further controlled by the tube relay contact 178B. Heating of tube 180 is caused to occur at a slower rate than the other tubes, so as to assure heating of the filaments of the latter to the proper operating temperature prior to closing of contacts 178B in the plate circuits of the latter tubes, by insertion of a series resistor 285 in the filament circuit of tube 180.

It will be clear from the preceding description, therefore, that while the control means 233 are conditioned for operation by proper insertion of a control tape in reader 138, these control means are retained in an inactive state during automatic threading of the tape 132. Accordingly, the clutches and brake of the mechanical drive system are retained in a normal inoperative condition during automatic threading of the control tape to avoid undesirable vibrations in the drive system.

Upon automatic threading of the control tape to a position wherein the first control group 134 thereon is aligned with the reader brushes, the control mechanism 100 is conditioned for initiation of printer operation during which the coded tape information is converted to decimal information and supplied to the drive system 102 by the computer 212 now to be described.

The coils of the relays 214–222 in the computer 212 have one terminal connected to the A.C. input terminal 154 through main switch contacts 162A, lead 176, tube relay contacts 178A and leads 186 and 188. The other terminals of relay coils 214–222 are each connected to one of the reader brushes 144a–144e through leads designated as 285a–285e.

The reader platen 146 is connected, as shown, to lead 194 and thence to the other A.C. terminal 156 through the safety switches and lead 198. It is clear, therefore, that contact of any one of the reader brushes with the platen 146, such as occurs when a control group 134 is aligned with the brushes, results in energizing of its respective computer relay 214–222. It is assumed here, of course, that tube relay contacts 178A and reader safety switches 196 are closed, owing to a control tape being properly inserted in the reader.

Computer relays 214–222 have, respectively, 1, 2, 4, 8 and 16 sets of contacts each identified by the corresponding number of the relay and a subscript denoting the number of the contact set. Thus, for example, the sets of contacts in relay 218 have been designated as $218_1$, $218_2$, $218_3$ and $218_4$. Further, each set of contacts has three terminals, namely, a normally closed terminal, a normally open contact, and a common, or arm terminal. Hereinafter, these terminals are designated as follows. The normally closed terminal is designated by the subscript C, a normally open terminal designated by the subscript O, and a common, or arm, terminal, designated by the subscript A. Thus, for instance, the three terminals of the set of contacts $218_3$ are designated as $218_{3C}$, $218_{3O}$ and $218_{3A}$.

The several sets of contacts are electrically connected, as follows. The two terminals $214_{1O}$ and $214_{1C}$ of relay 214 are connected, respectively, to the terminals $216_{1A}$ and $216_{2A}$ of the contacts in relay 216. Similarly, the terminals $216_{1O}$, $216_{1C}$, $216_{2O}$ and $216_{2C}$ are connected respectively, to the terminals $218_{1A}$, $218_{2A}$, $218_{3A}$ and $218_{4A}$ of the contacts in relay 218. The remainder of the relay contacts are similarly connected, as will be readily observed in FIGURE 7B.

Terminal $214_{1A}$ of the first, or lower, relay 214 is connected to the negative D.C. supply lead 168. The lead 208, previously described, leading to the upper end of the tape advance relay 204 through the normally closed contacts 204B of the latter, is connected to the final contact $222_{16C}$ of the last, or upper, computer relay 222.

From the description of the computer thus far, it will be readily seen that when all of the computer relays 214–222 are deenergized, the earlier mentioned current path 210 through the computer may be traced from the first relay terminal $214_{1A}$ to the last relay terminal $222_{16C}$ along a path including the following contact terminals in the order listed $214_{1A}$, $214_{1C}$, $216_{2A}$, $216_{2C}$, $218_{4A}$, $218_{4C}$, $220_{8A}$, $220_{8C}$, $222_{16A}$, $222_{16C}$.

It is clear then that when all of the computer relays are deenergized, the current path 210, and therefore, the energizing circuit for the tape advance relay 204, are established. If, however, any one or more of the relays 214–222 are energized, such as occurs upon aligning of the first control group in the control tape with the tape reader, the current path 210 and, therefore, the energizing circuit of the advance relay 204, are broken and automatic advancing of the tape is terminated, as previously mentioned.

The normally open and closed terminals of the contacts of the last relay 222 are connected through the leads shown to a series of arm contacts designated as $286_0$–$286_{30}$, as follows: terminal $222_{1C}$ connects to contact $286_0$, terminal $222_{2O}$ connects to contact $286_{29}$, terminal $222_{2C}$ connects to contact $286_{28}$, and so on, the last terminal $222_{16C}$ in the relay 222 connecting to the contact $286_0$. The first terminal $222_{1O}$ of relay 222 is connected, via a lead 287, to one end of the relay 272, previously mentioned and hereinafter more fully described.

The contacts $286_0$–$286_{30}$ are mounted on a plate 288 (FIGURES 2, 3 and 4) and arranged along an arc having its center on the axes of the attachment shaft 70. Contacts 286 are insulated one from the other in some suitable manner, such as by making the plate 288 of a non-conductive material.

Also, the contacts 286 are arranged for individual adjustment thereof along the arc, such as by providing threaded shanks 290 (FIGURE 3) on the contacts for receipt in circular grooves 291 in the plate 288 and lock nuts 292 on the shanks 290 to retain the contacts in adjusted position along the grooves 291. The reason for this adjustment of the contacts will presently be made clear.

Figure 7A:
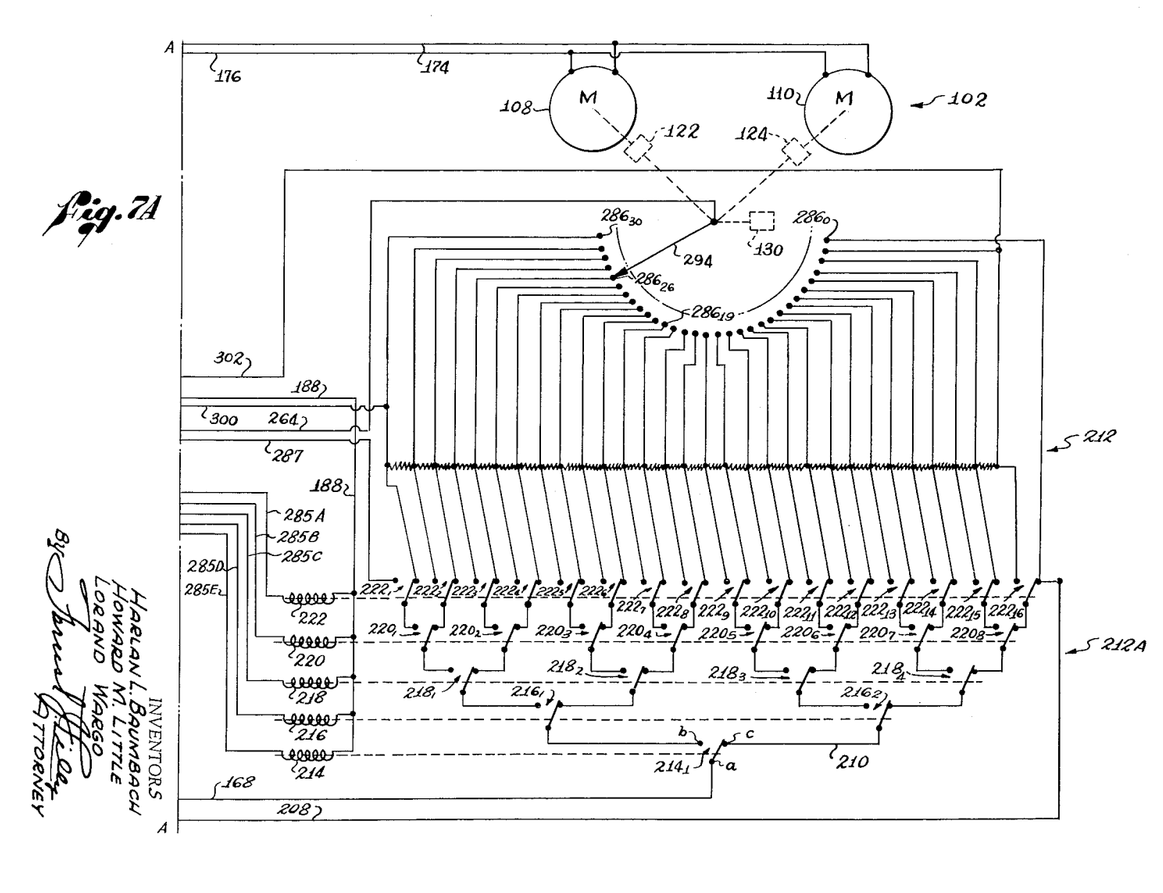
FIGURES 7A and 7B are schematic circuit diagrams of the electrical control mechanism of the attachment, lines A—A of the figures denoting a common section line through the figures.
Figure 7B:
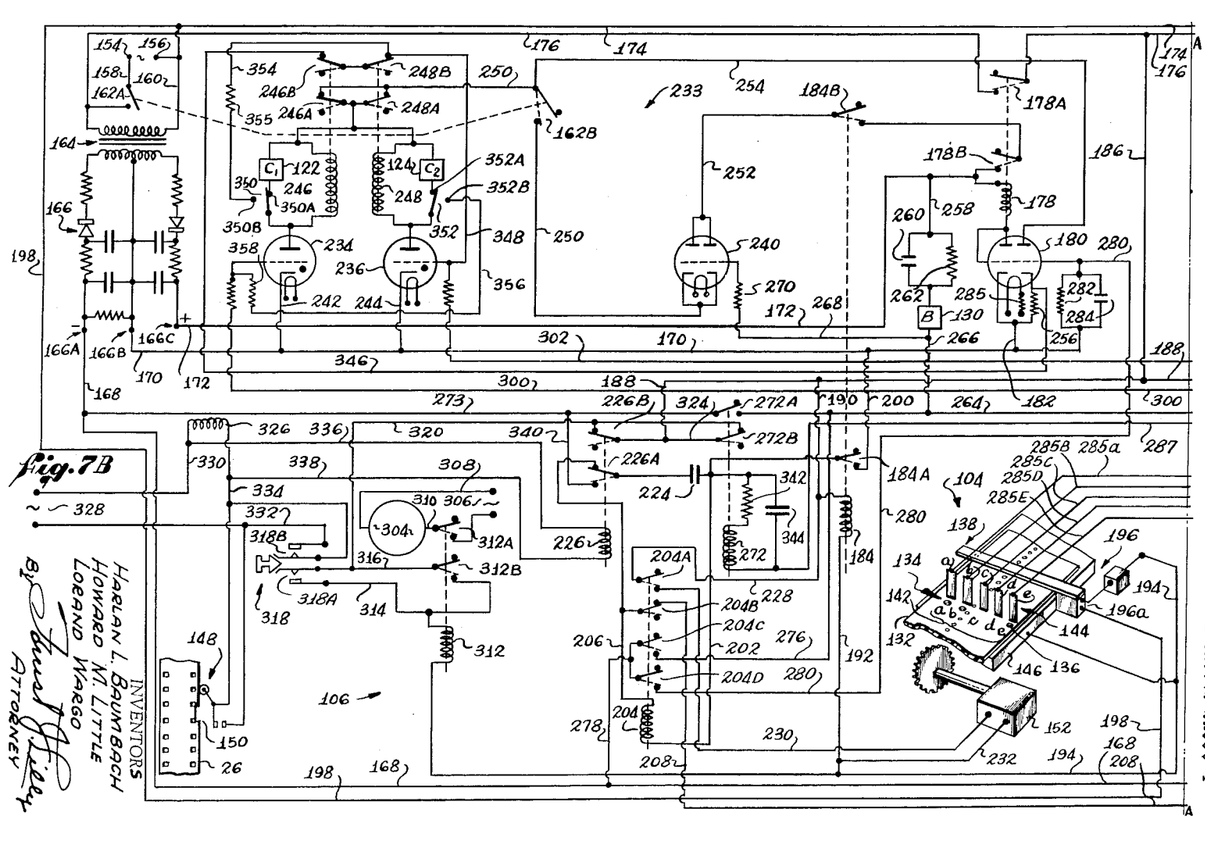

Indicated at 294 in FIGURES 2 and 7B is a swingable contact arm having one end fixed to the attachment shaft. The other end of the arm 294 carries a pair of contact elements 295 arranged to move over and bear against the contacts 286 as the arm 294 turns with the shaft 70. Arm 294 is connected to lead 264, as shown. Contacts 286 and contact arm 294 form a means to sense a plurality of positions of shaft 70, the contacts 286 providing, in effect, a series of individual position sensing elements.

Connected between adjacent ones of the leads connecting the contacts 286 and their respective terminals in the relay 222, are a group of equal resistors 296 which are, in effect, connected in series. The end of this series or string of resistors proximate to the contact $286_{30}$ is connected to the grid of thyratron tube 234, through a lead 300. The opposite end of this string of resistors is connected to the grid of the other thyratron tube 236 through a lead 302.

As was previously mentioned, computer 212 converts the coded binary light change information contained on the control tape 132 to decimal information necessary to positioning of the printer crank 30 in thirty light change positions by the attachment. The binary coding system employed on the control tape is conventional and is based on the number and arrangement of the perforations in the control positions of each control group 134.

In the present control system, the control positions $a$–$e$ are assigned unit values of 1, 2, 4, 8 and 16, respectively, the decimal equivalent of a particular control group being the sum of the unit values of the perforated control position. For example, the decimal equivalent of a control group having perforations in position $b$ is 2, the decimal equivalent of a control group having perforations in positions $a$, $b$ and $e$ is 1+2+16 or 19, and so on.

It will be immediately apparent that a control group may be perforated in thirty-one different ways, starting with a single perforation in position $a$ and ending with perforations in all five control positions, and, therefore, that each control group may be preset to have a decimal equivalent ranging from 1–31 inclusive. In the present control attachment, thirty of these possible combinations, namely, those having decimal equivalents ranging from 1 (corresponding to a perforation in control position $a$) to 30 (corresponding to perforations in control positions $b$, $c$, $d$ and $e$) are reserved for presetting the desired, sequential printer crank positions. The five hole condition of perforations in all five positions, having a decimal equivalent of 31 is used to effect termination of printer operation. Finally, a no hole condition is used to cause initial automatic threading of the control tape to the first control group, as has already been described.

The computer 212 is operative in response to the coded binary information supplied thereto by the information storage system to first convert this information to its decimal equivalent, secondly to generate a direction signal for indicating the direction in which the drive system 102 shall drive to move the printer crank to the preselected light change position, and finally to generate a stop signal upon the printer crank reaching that position. These computer operations are accomplished as follows.

For this discussion, we will assume first that the control mechanism is in a condition wherein the control tape 132 has just been advanced to the first control group 134 and that the latter control group contains a perforation in position $a$. It is clear in the light of the discussion thus far that relay 222 is energized, owing to the presence of that perforation in the first control group. The several contact arms of the relay 222 are thereby pulled to the left, as viewed in FIGURE 7B, out of engagement with the several contact terminals $222_{1C}$–$222_{16C}$, and into engagement with the several terminals $222_{10}$–$222_{16O}$. As just mentioned, this opens the current path 210 through the computer and terminates automatic threading of the control tape.

With relay 222 thus energized, a circuit may be traced from the negative D.C. supply lead 168 to the contact $286_1$ through the following terminals $214_{1A}$, $214_{1C}$, $216_{2A}$, $216_{2C}$, $218_{4A}$, $218_{4C}$, $220_{8A}$, $220_{8C}$, $222_{16A}$, $222_{16O}$ and thence to the contact $286_1$. Similarly, if any one of the other four computer relays are energized in response to a perforation in its respective control position of the first control group, a circuit may be readily traced from the negative D.C. supply lead 168, through the contact terminals of the relays, to that contact which bears the same subscript as the decimal equivalent of the control position containing the perforation.

For example, if relay 218 is energized in response to a perforation in position $c$, a circuit will be readily seen to be completed from the negative supply lead 168 to the contact $286_4$.

Now assume that the first control group contains perforations in control positions $a$, $b$ and $e$, having a decimal equivalent of 19. A circuit may then be traced from the negative supply lead 168 to the contact $286_{19}$ through the following series of terminals $214_{1A}$, $214_{10}$, $216_{1A}$, $216_{1C}$, $218_{2A}$, $218_{2C}$, $220_{4A}$, $220_{40}$, $222_{7A}$, $222_{70}$, and thence to the contact $286_{19}$. In a similar manner, if the first control group contains any other combination of two, three or four perforations, a circuit may be traced from the negative D.C. supply lead 168 to that contact 286, which bears a subscript equal to the decimal equivalent of the control group.

It will be clear then, that any one of the contacts $286_1$–$286_{30}$ may be connected to the negative D.C. supply lead 168 by properly coding a particular control group.

The aforementioned five hole condition in a control group, of course, results in energizing of all five relays 214–222. A circuit is then completed from the negative D.C. supply lead 168, through terminals $214_{1A}$, $214_{10}$, $216_{1A}$, $216_{10}$, $218_{1A}$, $218_{10}$, $220_{1A}$, $220_{10}$, $222_{1A}$, $222_{10}$ to lead 287 to condition the equipment for shut-down as will presently be described.

Let us now assume that a control tape, having a first control group containing perforations in control positions $a$, $b$ and $e$, is inserted in the reader 138, and that operation of the equipment is initiated by closing of the main switch contacts 162A and 162B. The main relay contacts 184A and 184B and the tube relay contacts 178A and 178B are thereby closed, as described before, and the control tape is advanced to the first control group 134. Also assume that the contact arm 294 bears on any one of the contacts 286, say contact $286_{26}$, as shown in FIGURE 7B.

From the previous discussion, it is clear that upon aligning of the first control group with the reader brushes 144, a circuit is established between the negative D.C. supply lead 168 and the contact $286_{19}$. Referring to FIGURES 7A and 7B, as well as to the simplified circuit diagram of FIGURE 6 showing the pertinent elements of the portion of the control circuit under discussion, it will be seen that a circuit may now be traced from the positive D.C. supply lead 172, through brake 130, lead 266 and 264 to the contact arm, and thence to the contact $286_{26}$, through the resistors 296, to contact $286_{19}$, and through the contacts of relays 214–222 to the negative D.C. supply lead 168.

The resulting D.C. current flow through this circuit is insufficient to energize brake 130 which, therefore, is disengaged. The shaft 120 of the drive system 102 is thereby released for driving of the shaft 70 by one of the motors 108 and 110 upon energizing of one of the clutches 122 or 124.

Each of the resistors 296 has a value on the order of 40,000 ohms, while each of the two thyratron tubes 234 and 236 in their non-conductive state present grid circuit resistances on the order of 1000 megohms. The section of the computer 212 comprising the contacts of the relays 214–222, which section is designated in FIGURES 6 and 7B as 212A, of course has substantially zero internal resistance.

Figures 5, 6:
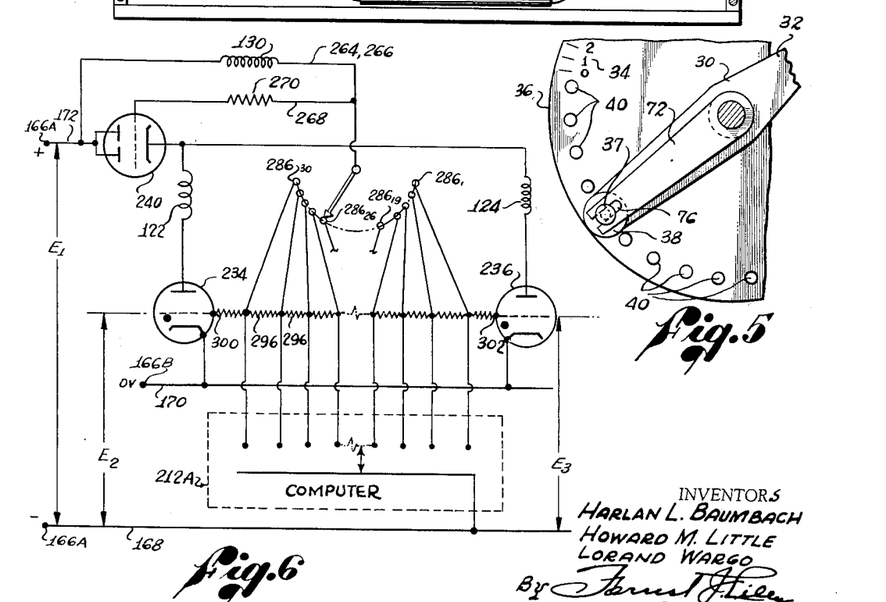
FIGURE 5 is a view taken along line 5—5 of FIGURE 4.
FIGURE 6 is a simplified, schematic circuit diagram of certain parts of an electrical control mechanism embodied in the attachment.

It will be clear, therefore, from FIGURES 6 and 7B, and especially the former figure, that the grid of the thyratron tube 234 has a voltage $E_2$ impressed thereon through the lead 300 while the thyratron has a voltage $E_3$ impressed thereon through the lead 302. Owing to the magnitudes, given above, of the internal resistances of these tubes, which are in their non-conductive state up to this time, as compared to the resistances 296, it is readily seen that the voltage $E_2$ impressed on the grid of thyratron 234 is positive and substantially equal to the output voltage $E_1$ of the rectifier 164 between its terminals 166A and 166C. The voltage $E_3$ on the grid of the other thyratron will be seen to be substantially zero, and the latter grid to be negatively polarized relative to its cathode.

This positive grid voltage on the thyratron 234 is sufficient to initiate conduction of the latter. It will further be seen that the contact arm 294, in its initial position of engagement with contact $286_{26}$, carries a positive potential which is impressed on the grid of the cut-off tube 240. This positive grid potential raises the tube 240 above cut-off so that the latter conducts, thereby completing the plate circuit of the thyratron tube 234 through clutch 122, lead 250 (FIGURE 7) including now closed main switch contacts, power tube 240, lead 252, including now closed main relay contacts 184B, and tube relay contacts 178B, to the positive D.C. supply lead 172.

Thyratron tube 234, therefore, conducts with resultant energizing of clutch 122. It will be remembered that brake 130 is released at this time. The drive system 102 is so arranged that energizing of this clutch causes driving of the attachment shaft 70, and, therefore, the printer crank 30 and contact arm 294 coupled thereto, in a counterclockwise direction, as viewed in FIGURES 6 and 7. Contact arm 294 thus moves in the direction of the preselected contact $286_{19}$. Contact arm 294, of course, carries a positive potential during its movement so that the power tube 240 will continue to conduct.

It will be observed that the grid of the inactive thyratron 236 is returned to the negative lead 168 rather than ground lead 170 during conduction of the active thyratron 234. This has the advantage of gaining negative polarization of the inactive thyratron and thus preventing the latter from misfiring in response to any parasitic transient pulses in the system.

Upon driving of the contact arm 294 in the counterclockwise direction into engagement with the preselected contact $286_{19}$, all resistors 296 are cut out, and the arm, and therefore the grid of the power tube 240, become negative.

This negative grid potential on the power tube drives the latter to cut off. The plate circuits of the thyratrons are thus opened and the active thyratron 234 ceases to conduct with resultant deenergizing of its clutch 122. Driving of the attachment shaft 70 and printer crank 30 is thereby discontinued.

Simultaneously, the increased current flow through the brake 130, in response to cutting out of the resistors 296, becomes sufficient to energize and thereby engage the brake. The shaft 70 and printer crank are thus locked against accidental displacement in the preselected position. The negative potential remains on the grid of the power tube 240, so that both clutches 122 and 124 remain deenergized. The increased current flow through the brake 130 continues, so that the latter remains engaged, as long as the contact $286_{19}$ remains in circuit with the negative D.C. lead 168.

In view of what has been said, it is evident that if contact arm 294 had occupied an initial position in engagement with one of the contacts $286_1$–$286_{18}$, voltage $E_3$ (FIGURE 6) would have become positive and substantially equal to the applied voltage $E_1$, while the grid voltage $E_2$ would be substantially zero.

In this case then, thyratron 236 would be rendered active, to cause driving of the shaft 70 and arm 294 in a clockwise direction toward the preselected contact $286_{19}$, while thyratron 234 would remain inactive. Driving of the shaft 70 would, of course, cease upon the contact arm reaching the preselected contact for the reasons just stated. Also, the grid of the inactive thyratron 234 would be negatively polarized so that misfiring of the latter tube would be prevented, as before.

From the description thus far, it will be seen that by proper coding of the first control group 134, the attachment shaft 70, and, therefore, the printer crank 30 can be moved to any one of the 30 different angular positions established by the 30 contacts $286_1$—$286_{30}$. As previously mentioned, these contacts are adjustable. Prior to operation of the attachment on a given printer, the contacts are so positioned that the 30 angular shaft positions established thereby correspond to the 30 light change positions of the printer crank.

The printer crank position determined by contact $286_1$ is set to correspond to a condition wherein the printing light aperture is of minimum area, and that position determined by the contact $286_{30}$ is set to correspond to a condition wherein the aperture is open to its maximum extent. The printer crank positions defined by the remaining contacts provide different printing light conditions between these minmum and maximum intensity conditions, which differ by equal increments of light intensity in the well known manner.

After the printer crank has been positioned, in accordance with the light change information contained in the first control group of the tape, as described above, the equipment is conditioned for initiation of operation of the printer 20.

Printer 20 comprises a motor, indicated at 304 in FIGURE 7A, one terminal of which is connected to one terminal of a power supply 306 through a lead 308. The other terminal of the printer motor is connected to the other terminal of the supply 306 through a lead 310, including a set of normally open, series connected contacts 312A in a starting relay 312. One end of the coil of relay 312 is connected to the A.C. input terminal 156 through lead 194, reader safety switches 196 and A.C. supply lead 198.

Connected to the other end of starting relay coil 312 are a pair of leads 314 and 316, the former including a set of normally open contacts 318A of a starting switch 318 and the latter lead 316 including a set of normally open holding contacts 312B of the relay 312. Leads 314 and 316 connect to a lead 320 which extends to one terminal of a pair of normally closed contacts 226B and 272B in the previously mentioned relays 226 and 272. The other terminals of the contacts 226B and 272B are connected via a common lead 324 to the lead 188 which connects to the other A.C. input terminal 154 through leads 186 and 176, tube relay contacts 178A and main switch contacts 162A.

It is clear, therefore, that proper insertion of a control tape into the reader 138 and closing of the main switch contacts 162A conditions the starting relay 312 for energization by closing of the starting switch 318. Starting switch reopens immediately upon release thereof. The starting relay 312, however, remains energized, owing to closure of its holding contacts 312B. Starting relay contacts 312A, of course, closed in response to energizing of the starting relay with resultant energizing of the printer motor 304. Film 26 is thereby fed through the printing beam of the printer.

As is well known, the printing light aperture is not adjusted directly from the crank 30 of the printer. Rather, the adjustable shutter plates are releasably retained in position by a solenoid actuated latch. These plates are coupled to the printer crank through an elastic coupling which is tensioned in response to movement of the printer crank in either direction from the light change position corresponding to the position of the shutter plates.

When the solenoid latch is energized, the plates are released for movement under the action of the tensioned elastic coupling. Stops associated with the printer crank stop the shutter plates in positions wherein the printing light intensity corresponds to the printer crank position. The plates are again latched in this new position to enable subsequent adjustment of the printer crank to another setting.

It will be seen, therefore, that while the printer crank 30 has been positioned in accordance with the light change information contained in the first control group 134 of the tape 132, in the manner previously described, the actual printing light intensity in the printer will correspond to the setting of the printer crank prior to the aforedescribed operation of the attachment, i.e., setting 26 in the example given earlier.

To assure the proper printing light condition for the first scene of the negative, namely, that light condition corresponding to the coding of the first control group on the control tape, therefore, it is necessary to release the solenoid latch for the shutter plates to effect movement of the latter to the new initial setting of the printer crank.

To this end, the solenoid of the latch, which solenoid is indicated at 326 in FIGURE 7A, has one end connected to an A.C. supply 328 through a lead 330. The other terminal of the A.C. supply 328 is connected to the other end of the shutter release solenoid 326 through a lead 332, including a set of normally open contacts 318B of the starting switch 318, and a lead 334.

Thus, actuation of the starting switch simultaneously energizes the printer motor 304 and the shutter release solenoid 326. The proper shutter plate setting for the first scene of the negative is thereby accomplished.

Relay 226, previously mentioned, is connected in parallel with the shutter release solenoid 326 through leads 336 and 338, so as to be energized whenever the latter solenoid is energized. As shown, the normally open side of contacts 226A of relay 226 is connected via a lead 340 to the lead 273 which extends to the D.C. supply lead 168. Accordingly, when the relay 226 is energized in response to actuation of the starting switch 318, one terminal of the condenser 224, arranged in shunt with the advance relay 204, is connected to negative D.C. lead 168. Since main relay contacts 184A are now closed, the other terminal of the condenser 224 is connected to the positive D.C. lead 170 through lead 200.

Condenser 224 is thus charged whenever the relay 226 energizes. When the latter relay deenergizes, such as occurs upon release of the starting switch 318, the normally closed side of the contacts 226A reclose and the condenser 224 discharges through the advance relay 204. Contacts 204A of this latter relay are thereby momentarily closed to pulse the tape advance unit 152.

Thus, when initiating printer operation by actuation of the starting switch 318, the shutters are released for movement to the initial setting established by the first control group on the tape and the tape is simultaneously advanced to the second control group. The delay in the system is sufficient to assure movement of the shutter plates to and latching thereof in the initial setting before movement of the printer crank, in response to the second control group, occurs.

Upon aligning of the second control group 134 with the reader brushes 144, the control mechanism becomes operative to cause movement of the attachment shaft 70, and therefore the printer crank 30, to the setting established by the coding of the second control group. This movement is accomplished in the same manner as described with reference to the first control group and will not be described in detail again. Suffice it to say that if the second control group contains perforations in control positions $d$ and $e$, for example, the shaft 70 and printer crank will be driven in a clockwise direction away from the initial preselected contact $286_{19}$ to the second preselected slide contact $286_{24}$.

As previously mentioned, during a printing operation, the present control mechanism is cued by notches 150 cut in the negative film at those positions where a printing light correction is desired. To this end, the aforementioned interrupter switch 148 is connected in shunt with the starting switch 318, as shown.

It is evident, therefore, that each closure of the interrupter switch 148 in response to movement of a cuing notch 150 therepast, simultaneously energizes shutter release solenoid 326 and relay coil 226 to effect release of the printer shutter plates from their initial position to the preselected position established by the second control group on the control tape and advancing of the control tape to the third control position. The printer crank is thereupon driven to the preselected setting determined by the third control group, in readiness for the next following light correction while the shutter plates remain latched in the setting established by the second control group.

This action is repeated in response to passage of each cuing notch 150 past the interrupter switch 148. Thus, the predetermined, sequential light corrections preset into the control mechanism by appropriate coding of the successive control groups 134 are effected automatically during operation of the printer.

As was previously mentioned, the last control group on the control tape is coded to terminate printer operation by perforating all five control positions in that control group. Thus, it will be recalled that such a five hole condition in the tape energizes all five computer relays 214–222 and results in connection of one end of the stop relay coil 272 to the negative D.C. supply lead 168 through lead 287 and the first contacts of the computer relays. Since the other end of the stop relay coil is connected via the now closed main relay contacts 184A and lead 200, to the positive D.C. supply lead 170, the stop relay is energized by the five hole control group.

Normally closed contacts 272B of the stop relay thus open and the normally open contacts 272A thereof close. This action does not, however, cause immediate shut-down of the equipment. The reason for this is clear when it is remembered that the control tape actually leads the printer operation by one control position. That is, while the printer is operating under the light condition established by one control group 134, the next control group is aligned with the tape reader 138 and the computer relay contacts are set in accordance with the coding of the latter control group.

Thus, when the last light correction, corresponding to the coding of the second to the last control group, is effected, the tape is immediately advanced to the last five hole control group. If shut-down of the equipment occurred immediately in response to energizing of the stop relay 272, therefore, the last scene of the negative would not be printed.

It will be observed, therefore, that after opening of the stop relay contacts 272B, the holding circuit for the motor relay 312 remains intact through the normally closed contacts 226B of relay 226.

To effect the actual shut-down of the equipment, a final cuing notch 150 is cut in the end of the negative film 140. Closing of the interrupter switch in response to this notch energizes the relay 226. The contacts 226B of the latter relay are thereby momentarily opened, with resultant deenergizing of the motor relay 312 and opening of its motor contacts 312A and its holding contacts 312B. Motor relay 312, as well as the printer motor 304, therefore, remain deenergized.

Connected in series with the stop relay 272 is a resistor 342 and shunting the relay is a condenser 344. These elements serve to delay deenergizing of stop relay 272, upon advancing of the tape past the last control group in response to the last cuing notch, sufficiently long to assure termination of printer operation by energizing of relay 226 in response to the last cuing notch.

Immediately upon energizing of the stop relay 272, its contacts 272A close to apply the negative potential of the negative D.C. lead 168 to the grid of the power tube 240 through leads 273, 266 and 268. The power tube is thereby biased to cut off and the plate circuits of the thyratrons 234, 236 are retained in open condition.

As just mentioned, energizing of the relay 226 in response to the last cuing notch 150 in the film 226 momentarily opens contacts 226B to stop the printer. Simultaneous closure of the normally open side of these latter contacts results in pulsing of the tape advance unit 152 in the manner previously described. This, of course, advances the control tape beyond the last control group thereon with resultant deenergizing of the five computer relays 214–222.

Current path 210 through the computer is thus re-established and automatic threading of the tape occurs, as before. Upon the tape being advanced to the end, the reader safety switches 196 open to deenergize the main control relay 184. Opening of the main relay contacts 184A and 184B, of course, deactivates the control mechanism.

It will be recalled that positioning of shaft 70 by the drive system 102 in response to the first control group 134 is dependent on energizing of one of the clutches 122 or 124 by discharge of its respective thyratron tube 234 or 236. Discharge of the thyratron tubes, in turn, is conditioned on contact of the arm 294 with one of the contacts 286 other than that contact which is preselected by the first control group.

It is evident, therefore, that if in initially mounting the attachment on the printer, the arm 294 is inadvertently left in a position between two of the contacts 286, so that it touches none of the contacts, or if, when the equipment is shut down for some reason, the slide arm is left in such a position, the positive potential for firing one or the other of the thyratrons 234, 236 will not be developed in the computer 212 when the attachment is energized. Under such conditions, the equipment could not be started. The same result, of course, would occur if a particle of foreign matter insulates the contact arm from its adjacent contact.

Thus, for instance, assume that the first control group 134 of the control tape contains perforations in control positions $a$, $b$ and $e$, as in the example earlier given. The contact preselected by the first control group is, therefore, $286_{19}$, as before. Assume further that in lieu of initially engaging the contact $286_{26}$, as in the earlier example, the arm 294 occupies an initial position between contacts $286_{26}$ and $286_{27}$.

When the first control group is aligned with the reader brushes 144 by automatic threading of the control tape 132, therefore, contact $296_{19}$ is connected to the negative D.C. lead 168, as before. Since arm 294 does not at this time touch any of the contacts, however, the current flow, previously described, through the computer resistive network does not occur. The grids of both thyratrons 234 and 236, therefore, are negatively polarized from the negative D.C. lead 168. Neither of the thyratrons conduct under these conditions and the clutches 122, 124, therefore, remain deenergized and disengaged. The attachment thus remains inoperative.

This deficiency is overcome in the present control mechanism as follows. It will be recalled that during intermittent energizing of the tape advance relay 204 to automatically thread the control tape 132 to the first control group 134, a negative potential is intermittently impressed on the right hand grid of the relay tube 180 by intermittent closure of the tape advance relay contacts 204D. As mentioned, the condenser 284 between the latter grid and its respective cathode is thereby charged and the right half of the relay tube is maintained below cut off during the automatic threading operation.

Upon the first control group 134 becoming aligned with the reader brushes 144, the tape advance relay 204 remains deenergized and its contacts 204D remain open. Relay tube condenser 284 now gradually discharges through its shunt resistor 282. The potential on the right hand grid of the relay tube 180, therefore, gradually rises to the potential of its cathode, so that the latter tube gradually starts to conduct. This conduction of tube 180 is, of course, permitted, since there is no current flow through the brake circuit and the grid of power tube 240 is positively polarized from the positive D.C. lead 172. The latter tube, therefore, conducts to complete the B supply to the right hand plate of tube 180.

The gradually increasing positive potential at the upper end of the cathode follower resistor 256, resulting from the gradually increasing current flow in the right half of the tube 180, is applied to the grid of the thyratron 236 through a lead 346, normally closed contacts 246B and 248B of the thyratron relays 246 and 248, and lead 348. Relay contacts 246B and 248B are, of course, closed at this time since both thyratrons are inactive.

This positive grid potential fires the thyratron 236 with resultant energizing of its respective clutch 124. The energizing circuit through brake 130 is open and the latter is accordingly disengaged. Shaft 70 and arm 294 are, therefore, driven in a clockwise direction as viewed in FIGURES 6 and 7B.

Thyratron relay contacts 246B and 248B are connected in series, as shown, so that opening of the latter contacts 248B in response to energizing of thyratron relay 248 breaks the cathode follower circuit to the grid of the thyratron 236. Thyratron 236, however, remains active.

Shaft 70 and arm 294 continue to drive in the clockwise direction until the arm 294 engages the contact $286_{27}$ whereupon the arm 294 immediately acquires a positive potential, and current flow through the resistive network of the computer 212 produces a positive potential on the grid of thyratron 234 and a negative potential on the grid of thyratron 236, all in the manner previously described.

Thyratron 234, therefore, starts to conduct while thyratron 236 continues to conduct momentarily, even though its grid is negative. Its relay contacts 248A are, therefore, open. Opening of relay contacts 246A in response to firing of the thyratron 234, therefore, momentarily opens the plate circuits of both thyratrons and both are extinguished with resultant reclosing of their relay contacts 246A and 248A. This again completes the thyratron plate circuits and tube 234 refires, owing to the positive potential on its grid. The grid of the other thyratron 236 is, however, negative so that the latter remains inactive.

It will be seen, therefore, that as soon as the arm 294 contacts the contact $286_{27}$, the direction of driving of shaft 70 and the contact arm is reversed and the latter moves toward the first preselected contact $286_{19}$. The control mechanism then continues to operate in the manner already described.

If the contact arm is initially positioned between two contacts, say contacts $286_{10}$ and $286_{11}$, to the right of the first preselected contact $286_{19}$, the system operates in a manner similar to that just described, except that upon driving of the arm in the clockwise direction to contact $286_{11}$, in response to the above described action of the cathode follower circuit, the thyratron 236 remains active. The shaft 70 and arm 294, therefore, continue to drive in the clockwise direction to the first preselected contact $286_{19}$.

It will be seen that during normal operation of the system, when both thyratron relay contacts 246B and 248B are closed, so that the grid of thyratron 236 is in circuit with the cathode follower 256, tube 240 is biased below cut off. The plate circuit of the right half of tube 180 is, therefore, open and the grid of thyratron 236 is not made positive by the cathode follower. On the other hand, when power tube 240 conducts, due to engagement of the arm 294 with other than a preselected slide contact 286, one or the other of the thyratron relay contacts 246B or 248B will be open so that the cathode follower circuit is open. Thus, during normal operation of the control mechanism, the cathode follower circuit remains inoperative.

Another condition of mal-operation which may arise is that a particle of foreign matter adhering to a contact which is preselected by one of the control groups 134 of the control tape 132 may prevent electrical contact between the preselected contact and the contact arm upon driving of the latter to the selected contact. De-energizing of the engaged clutch and reenergizing of the brake in response to movement of the arm to the preselected contact, as occurs during normal operation of the system, is, therefore, prevented.

The arm, therefore, continues past the preselected contact. Upon engagement of the arm with the first contact beyond the preselected contact, the grid potential of the active thyratron becomes negative while the grid potential of the previously inactive thyratron becomes positive for the reasons previously described.

Since the power tube 240 is not cut off, both thyratrons momentarily conduct. Both of the thyratron relay contacts 246A and 246B, therefore, open to break the thyratron plate circuits, and both tubes are extinguished with resultant reclosing of their contacts 246A and 248A. Since the grid of the previously active thyratron is now negatively polarized, the latter will remain extinguished.

The grid of the other previously inactive thyratron, on the other hand, has a positive potential. Upon reclosing of its contacts (246A or 248A), therefore, the inactive tube conducts and the shaft 70 and arm 294 are driven in the opposite direction. If the preselected contact is still contaminated, the arm is again driven past that contact, this cycle being repeated until the particle of foreign matter is removed. Engagement of the arm with the preselected contact then activates the break 130 and deactivates both thyratrons 234 and 236 and their respective clutches 122 and 124 and normal operation of the mechanism is resumed.

Limit switches 350 and 352 are provided to limit driving of the shaft 70 and slide arm 294 in opposite directions. Limit switch 350 has a pair of normally closed contacts 350A in series with clutch 122, while limit switch 352 has a pair of normally closed contacts 352A in series with clutch 124.

Limit switch 352 is arranged, as shown in FIGURE 2, to be engaged by arm 294 upon driving of the shaft 70, by clutch 122, in a counterclockwise direction to an extreme limit. Limit switch 350, on the other hand, limits clockwise movement of the shaft 70. Engagement of one or the other of the limit switches 350, 352 by arm 294 deenergizes the currently energized clutch.

Limit switches 350 and 352 include normally open contacts 350B and 352B, respectively. Contact 350B is connected to lead 348, extending to the grid of thyratron 236, through a lead 354 including a resistor 355. Contact 352B, on the other hand, is connected to lead 300, extending to the grid of thyratron 234, through a lead 356 including a resistor 358. Contacts 350B and 352B are closed simultaneously with opening of their respective contacts 350A and 350B.

Thus, when one or the other of the limit switches 350 or 352 is engaged by the contact arm 294, the clutch of the currently active thyratron, which effects driving of the arm toward the engaged limit switch, is deenergized by opening of the normally closed contacts of the engaged limit switch. Simultaneously, the normally open contacts of the engaged limit switch close and the positive plate potential of the currently active thyratron is applied to the grid of the other, or inactive thyratron. The latter tube, therefore, conducts.

Since both thyratrons are then in a state of conduction, both relays 246 and 248 will be momentarily energized and their contacts 246A and 248A will open. The plate circuits of both thyratrons are thereby extinguished and their respective relay contacts 246A and 248A reclose.

The grid of the previously active thyratron will, however, now be negatively polarized for reasons apparent from previous discussion. The grid of the previously inactive thyratron, on the other hand, will be positively polarized since the contacts 350B or 352B of the engaged limit switch will still be closed.

The previously inactive thyratron, therefore, refires with resultant driving of the contact arm 294 away from the engaged limit switch and returning of the latter to its normal condition. Normal operation of the mechanism is then resumed.

Driving of the contact arm to one or the other of its limiting positions might result, for example, from failure of the arm to engage the preselected contact as well as the contacts between the preselected contact and the adjacent limit switch. In another case, one of the terminal contacts $286_1$ or $286_{30}$ might be preselected and be contaminated so that the arm would continue to drive past the selected contact to the adjacent limit switch.

Summary of operation

After mounting of the attachment on the printer 20 and adjustment of the contacts 286 to correspond to the crank positions of the printer, a control tape 132 is threaded in tape reader 138. If the control tape is properly threaded, safety switches 196 close to partially complete the energizing circuit of the main control relay 184.

The main switch contacts 162A and 162B are now closed, thereby energizing the left half of the relay tube 180. Relay 178 energizes, in response to the delayed heating of tube 180, and its relay contacts 178A and 178B close.

Tape advance relay 204 is rendered operative, in response to energizing of the main control relay 184 by closure of tube relay contacts 178A, to pulse the tape advance unit 152 and thereby cause automatic, intermittent advancing of the control tape 132 to the first control group 134. Advancing of the tape is now discontinued, and the computer 212 becomes operative to position the contact arm 294, and, therefore, the printer crank 30, in the preselected light change position corresponding to the first control group. During this automatic threading of the control tape, as previously described, the control means 233 is conditioned for operation by closure of the main control relay contacts 184B while being retained in an inactive condition. Undesired vibration and oscillatory movement in the drive system 102 is thereby prevented.

Starting switch 318 is now actuated to initiate operation of the printer motor 304 and feeding of the film 26 through the printing beam. Simultaneously, the shutter release solenoid 326 and solenoid 226 are momentarily energized to release the shutter plates for movement to the initial preselected light setting, presently occupied by the printer crank 30, and advancing of the control tape 132 to the second control group 134. The printer crank 30 is thereby positioned in the preselected light change setting corresponding to the second control group. The intensity of the printing beam, however, remains at the value determined by the first control group.

The printer motor 304 is now locked in energized condition, and the film 26 is continuously fed through the printing beam with resultant printing on the positive film 28 of the several scenes of the negative. The system is operative in response to each cuing notch 150 in the negative film 26 to first release the shutter plates for movement to the light setting corresponding to one control group, and advance the control tape 132 to the next control group, and secondly, to position the printer crank at the light setting corresponding to said next control group.

The attachment continues to operate in this automatic, preselected manner until a five-hole control group is aligned with the reader brushes 144. The stop relay 272 is thereby energized to condition the mechanism to cause automatic termination of the printer in response to a last cuing notch in the negative film 26. Upon movement of this last cuing notch past the interrupter switch 148, the printer motor 304 is deenergized to terminate printer operation, and the control tape 132 is automatically threaded out of the tape reader.

Upon threading of the tape to its end, the reader safety switches 196 reopen with resultant deenergizing of the main control relay 184 and deactivation of the control mechanism.

It will be readily apparent in the light of the foregoing description that the present invention is susceptible of numerous modifications in design, instrumentalities and arrangement of parts. The invention should, therefore, not be thought of as limited to the illustrative embodiment thereof disclosed herein for illustrative purposes, but rather only by the spirit and scope of the following claims.

We claim:

1. An automatic light change mechanism for a film printer having means for feeding film past a printing light and a light change member which is movable to different preset positions to establish different predetermined printing light intensities, said mechanism comprising: a rotary driven shaft, means for drivably connecting said shaft and member so that the latter is moved to said preset positions by rotation of said shaft to different predetermined angular positions, presettable information storage means to be preset with bits of light change information each corresponding to a particular printing light intensity and defining a selected predetermined position of said shaft, first electrical sensing means for sensing the shaft positions defined by successive bits in synchronism with movement of film through the printer, second electrical sensing means for sensing the position of said shaft, electrical control means in circuit with said sensing means for comparing the shaft position defined by each bit as it is sensed with the current position of the shaft and generating an error signal when the shaft position defined by a given bit differs from the current position of the shaft, and electrical drive means controlled by said error signal for driving the shaft to the position defined by each bit.

2. An automatic light change mechanism for a film printer having means for feeding film past a printing light and a light change member which is movable in opposite directions to preset positions to establish different predetermined printing light intensities, said mechanism comprising: a rotary driven shaft, means to drivably connect said shaft and member for movement of the latter in opposite directions through said preset positions by rotation of said shaft in opposite directions, said shaft being turnable to different predetermined angular positions to locate said member in said preset positions, presettable information storage means to be preset with bits of light change information each corresponding to a particular printing light intensity and defining a selected predetermined position of said shaft, first electrical sensing means for sensing the shaft positions defined by successive bits in synchronism with movement of film through the printer, second electrical sensing means for sensing the position of said shaft, electrical control means in circuit with said sensing means for comparing the shaft position defined by each bit as it is sensed with the current position of the shaft and generating a first electrical error signal when the shaft position defined by a given bit is spaced in one direction of rotation from the current position of the shaft and a second electrical error signal when the shaft position defined by a given bit is spaced in the other direction of rotation from the current position of the shaft, reversible electrical drive means controlled by said error signals for driving the shaft toward the position defined by each bit, and said control means including means for generating a stop signal which deactivates said drive means to terminate driving of the shaft in response to rotation of the latter to said last-mentioned position.

3. An automatic light change mechanism for a film printer having means for feeding film past a printing light and a light change member which is movable to preset positions to establish different predetermined printing light intensities, said mechanism comprising electrical drive means including a rotary driven shaft, means for drivably connecting said shaft and member so that the latter is moved to said preset positions by rotation of said shaft to different predetermined angular positions, presettable information storage means adapted to be preset with coded bits of binary light change information each corresponding to a preselected printing light intensity and coded to correspond to a selected one of said predetermined shaft positions, first sensing means for sensing the control information in successive bits in synchronism with movement of film through the printer, computer means connected to said sensing means including an input terminal, a series of final terminals each associated with a particular predetermined shaft position, and means for establishing an electrical circuit from said input terminal to the final terminal associated with the predetermined shaft position corresponding to each bit as it is sensed, second sensing means for sensing the angular position of said shaft including a contact arm coupled to the shaft, a series of electrical contacts over which the arm moves as the shaft turns, each contact being associated with a particular predetermined shaft position and engaged by the arm when the shaft occupies the associated position, and electrical control means including circuit means connected to said contacts and final terminals for comparing the predetermined shaft position corresponding to each bit as it is sensed with the current predetermined position of said shaft and operating said drive means to drive the shaft to the predetermined position corresponding to each bit.

4. An automatic light change attachment for a film printer including means for feeding film past a printing light and a light change crank turnable in opposite directions to a series of preset angular positions in synchronism with movement of film through the printer to establish different predetermined printing light intensities, said attachment comprising: a housing, reversible rotary drive means on the housing including a rotary driven shaft extending at one end to the outside of the housing, means on the housing for mounting the latter on the printer with said shaft coaxial with the turning axis of the printer crank, centering means on said one end of the shaft engageable with the crank to retain the latter and shaft in coaxial alignment, coupling means on said one end of the driven shaft engageable with the printer crank to drivably connect the latter and shaft for turning of the latter to said preset positions by turning of said driven shaft to predetermined positions, and presettable control means connected to said drive means for intermittently operating the latter to rotate said driven shaft to preselected ones of said predetermined positions in synchronism with movement of film through the printer.

5. The subject matter of claim 4 wherein the printer includes a scale plate located behind the light change crank, said mounting means comprising bracket means on said housing for hanging the latter on the printer scale plate.

6. The subject matter of claim 4 wherein said coupling means comprises a radial arm on said end of said shaft having driving surfaces engageable with the printer crank.

7. The subject matter of claim 4 wherein said centering means comprises a projecting axial center point on said one end of said shaft.

8. An automatic light change attachment for a film printer including means for feeding film through a printing light and a light change crank turnable in opposite directions to a series of preset angular positions in synchronism with movement of film through the printer, said crank having a crank handle at one end, said attachment comprising: a housing, reversible rotary drive means on the housing including a rotary driven shaft extending at one end to the outside of the housing, means on the housing for mounting the latter on the printer with said shaft coaxial with the turning axis of the printer crank, centering means on said one end of the shaft engageable with the printer crank to retain the latter and shaft in coaxial alignment, a radial arm on said one end of the shaft having a recess in its free end for engaging the crank handle to drivably connect said shaft to the crank for turning of the latter to said preset positions by turning of said shaft to predetermined positions, and presettable control means connected to said drive means for intermittently operating the latter to rotate said shaft to preselected ones of said predetermined positions in synchronism with movement of film through the printer.

9. An automatic light change mechanism for a film printer having means for feeding film past a printing light and a light change member which is movable to different preset positions to establish different predetermined printing light intensities, said mechanism comprising: electrical drive means including a rotary driven shaft, means for drivably connecting said shaft and member so that the latter is moved to said preset positions by rotation of said shaft, first electrical sensing means for sensing the angular position of said shaft comprising a rotary switch device operatively connected to said shaft and including a contact arm and a plurality of contacts successively engaged by the arm as the shaft rotates to different angular positions, presettable information storage means adapted to be preset with bits of light change information each corresponding to a particular printing light intensity and defining a selected one of said contacts, second electrical sensing means for sensing the control information contained in successive bits in synchronism with movement of film through the printer, control means in circuit with said sensing means and drive means for comparing the contact defined by each bit as it is sensed with the contact engaged by said contact arm in the current position of the shaft and operating said drive means to drive said shaft and contact arm corresponding to the respective bits, and means for adjusting the positions of said contacts to adjust the angular positions occupied by the shaft when the contact arm engages the respective contacts whereby to match the latter angular shaft positions to the preset positions of the light change member.

10. An automatic control attachment for a film printer having means for feeding film past the printing light and a light change member which is movable to a series of successive preset positions to establish different printing light intensities, said attachment comprising a driven member, means for drivably connecting said members for movement of the light change member to its different preset positions by movement of the driven member, a position sensing means including a plurality of position sensing elements spaced in the direction of movement of the driven member for sensing a plurality of successive positions of the driven member equal in number to said preset positions of the light change member, an information storage means adapted to be preset with bits of light change information each defining a particular one of said successive positions of the driven member, means for successively sensing said bits in synchronism with movement of film through the printer, means including said position sensing means and information sensing means for driving said driven member to the position defined by each bit of information as it is sensed, and means for independently adjusting the said position sensing elements in said direction of movement of the driven member for the purpose of matching said successive positions of the driven member to said preset position of the light change member.

11. A light change mechanism for a film printer having means to feed film past a printing light and a light change member which is movable in opposite directions to a plurality of preset positions to establish different printing light intensities, said mechanism comprising a driven member, means for drivably connecting said members for movement of the light change member to its preset positions by movement of the driven member to a series of corresponding predetermined positions, said member being movable in opposite directions through said predetermined positions and between given limiting positions, an information storage means to be preset with bits of light change information each defining a particular predetermined position of said driven member, means for successively sensing said bits, reversible drive means controlled by said sensing means for driving said driven member toward the predetermined position corresponding to each bit as it is sensed, a means to sense movement of the driven member through each of its predetermined positions and to deactivate said drive means upon said driven member reaching said corresponding predetermined position, and limit means to reverse said drive means upon movement of the driven member to either limiting position.

12. A light change attachment for a film printer having means to feed film past a printing light and a light change crank which is turnable to a series of preset positions to establish different printing light intensities, said attachment comprising a housing, means to releasably mount said housing on the printer, a rotary driven shaft on the housing, means to drivably connect said shaft and printer crank for turning of the latter to its preset positions by rotation of said shaft to corresponding predetermined positions, a selectively operable, reversible drive means in the housing for driving said shaft to said predetermined positions, and a means to sense the position of said shaft including a series of contacts each associated with a particular predetermined shaft position and a contact arm driven by the shaft and movable over said contacts as the shaft turns.

13. The subject matter of claim 12 including means to independently adjust said contacts in the direction of movement of the contact arm over the contacts.

14. The subject matter of claim 12 wherein said shaft is coaxial with the turning axis of the printer crank.

15. An automatic light change attachment for a film printer including means for feeding film through a printing light and a light change crank turnable in opposite directions to a series of preset angular positions in synchronism with movement of film through the priner, said crank having a crank handle at one end, said attachment comprising: a housing, reversible rotary drive means on the housing including a rotary driven shaft extending at one end to the outside of the housing, means on the housing for mounting the latter on the printer with said shaft coaxial with the turning axis of the printer crank, centering means on said one end of the shaft engageable with the printer crank to retain the latter and shaft in coaxial alignment, and a radial arm on said one end of the shaft having a recess in its free end for engaging the crank handle to drivably connect said shaft to the crank for turning of the latter to said preset positions by turning of said shaft to predetermined positions.

References Cited in the file of this patent

UNITED STATES PATENTS

| | | |
|---|---|---|
| 1,463,737 | Debrie | July 31, 1923 |
| 1,891,398 | Wise | Dec. 20, 1932 |
| 1,933,693 | Adatte | Nov. 7, 1933 |
| 2,061,069 | Garbutt | Nov. 17, 1936 |
| 2,475,245 | Leaver et al. | July 5, 1949 |
| 2,753,500 | Calosi | July 3, 1956 |